US011356527B1

(12) United States Patent
Kudrin et al.

(10) Patent No.: US 11,356,527 B1
(45) Date of Patent: Jun. 7, 2022

(54) HIGH AVAILABILITY VIRTUAL DESKTOP INFRASTRUCTURE

(71) Applicant: PARALLELS INTERNATIONAL GmbH, Schaffhausen (CH)

(72) Inventors: Maxim Kudrin, Moscow (RU); Nikolay Dobrovolskiy, Moscow (RU); Serguei Beloussov, Costa del Sol (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 17/134,934

(22) Filed: Dec. 28, 2020

Related U.S. Application Data

(63) Continuation of application No. 16/807,159, filed on Mar. 2, 2020, now Pat. No. 10,904,350, which is a (Continued)

(51) Int. Cl.
*H04L 29/08* (2006.01)
*H04L 67/562* (2022.01)
(Continued)

(52) U.S. Cl.
CPC .......... *H04L 67/2809* (2013.01); *G06F 9/452* (2018.02); *H04L 63/083* (2013.01);
(Continued)

(58) Field of Classification Search
CPC ................... G06F 11/301; G06F 16/27; G06F 2209/5016; G06F 9/452; H04L 29/06;
(Continued)

(56) References Cited

U.S. PATENT DOCUMENTS 6,463,459 B1 * 10/2002 Orr .................... H04L 67/08
709/203
8,285,849 B2   10/2012 Oeda
(Continued)

FOREIGN PATENT DOCUMENTS

WO       2012037076 A1    3/2012
WO    WO-2012037076 A1 *  3/2012   ........... G06F 9/4416

*Primary Examiner* — Shean Tokuta
(74) *Attorney, Agent, or Firm* — Rosenberg, Klein & Lee

(57) ABSTRACT

A method for providing high availability Virtual Desktop Infrastructure (VDI) includes determining, by a VDI client and based on connection information for a first VDI broker associated with a first datacenter, whether a connection to the first VDI broker is available, and responsive to determining that the connection to the first VDI broker associated with the first datacenter is available, connecting the VDI client to a first VDI broker associated with a first datacenter. The method also includes sending authentication information pertaining to the user to the first VDI broker to authenticate the user through a domain controller, receiving, from the first VDI broker, a list of desktop pools available for one or more groups containing the user that has been authenticated with the first VDI broker, sending, to the first VDI broker, a desktop pool identifier associated with a desktop pool from the list of available desktop pools, receiving, from the first VDI broker, an address of a desktop selected from the desktop pool associated with the desktop pool identifier sent to the VDI broker, and providing the selected desktop to the user.

6 Claims, 7 Drawing Sheets

Related U.S. Application Data continuation of application No. 15/648,549, filed on Jul. 13, 2017, now Pat. No. 10,581,995.

(51) Int. Cl.
| | |
|---|---|
| *H04L 67/1095* | (2022.01) |
| *H04L 67/563* | (2022.01) |
| *H04L 67/306* | (2022.01) |
| *H04L 67/1097* | (2022.01) |
| *H04L 9/40* | (2022.01) |
| *G06F 9/451* | (2018.01) |

(52) U.S. Cl.
CPC ...... *H04L 67/1095* (2013.01); *H04L 67/1097* (2013.01); *H04L 67/2814* (2013.01); *H04L 67/306* (2013.01)

(58) Field of Classification Search
CPC ............... H04L 29/08576; H04L 47/70; H04L 67/1095; H04L 67/14; H04L 67/141; H04L 67/2809
See application file for complete search history.

(56) References Cited

U.S. PATENT DOCUMENTS

| | | | |
|---|---|---|---|
| 9,055,139 B1* | 6/2015 | Devireddy | H04L 65/60 |
| 9,148,350 B1* | 9/2015 | Suryanarayanan | H04L 41/50 |
| 9,274,821 B2 | 3/2016 | Chawla et al. | |
| 9,323,820 B1* | 4/2016 | Lauinger | G06F 16/27 |
| 10,146,566 B2 | 12/2018 | Malakapalli et al. | |
| 10,264,058 B1* | 4/2019 | Lauinger | G06F 9/45558 |
| 2008/0235361 A1 | 9/2008 | Crosbie et al. | |
| 2009/0248869 A1 | 10/2009 | Ghostine | |
| 2011/0125830 A1* | 5/2011 | Adelman | G06Q 20/102 |
| | | | 709/203 |
| 2011/0131330 A1* | 6/2011 | Beaty | G06F 9/452 |
| | | | 709/227 |
| 2011/0153838 A1* | 6/2011 | Belkine | G06F 11/301 |
| | | | 709/227 |
| 2012/0089666 A1 | 4/2012 | Goswami et al. | |
| 2012/0311457 A1* | 12/2012 | O'Gorman | G06F 9/452 |
| | | | 715/740 |
| 2012/0331032 A1* | 12/2012 | Balachandran | H04L 69/164 |
| | | | 709/202 |
| 2013/0067469 A1 | 3/2013 | Das et al. | |
| 2013/0073670 A1* | 3/2013 | Das | G06F 9/5027 |
| | | | 709/217 |
| 2013/0073703 A1 | 3/2013 | Das et al. | |
| 2013/0219043 A1* | 8/2013 | Steiner | G06F 9/4856 |
| | | | 709/224 |
| 2014/0108665 A1* | 4/2014 | Arora | H04L 65/1069 |
| | | | 709/227 |
| 2014/0165164 A1 | 6/2014 | Pizurica et al. | |
| 2014/0258155 A1* | 9/2014 | Suryanarayanan | G06Q 99/00 |
| | | | 705/318 |
| 2014/0258374 A1* | 9/2014 | Suryanarayanan | H04L 67/101 |
| | | | 709/203 |
| 2014/0258450 A1* | 9/2014 | Suryanarayanan | H04L 67/10 |
| | | | 709/217 |
| 2015/0006614 A1 | 1/2015 | Suryanarayanan et al. | |
| 2015/0142921 A1* | 5/2015 | Yamada | H04L 69/40 |
| | | | 709/219 |
| 2015/0201004 A1* | 7/2015 | Moon | H04L 67/10 |
| | | | 709/203 |
| 2015/0237081 A1 | 8/2015 | Taylor | |
| 2015/0339136 A1 | 11/2015 | Suryanarayanan et al. | |
| 2015/0358392 A1 | 12/2015 | Ramalingam et al. | |
| 2015/0373096 A1* | 12/2015 | Chandrasekaran | H04L 67/1014 |
| | | | 709/226 |
| 2016/0057123 A1* | 2/2016 | Jiang | H04W 12/06 |
| | | | 726/7 |
| 2017/0339070 A1* | 11/2017 | Chang | H04L 47/829 |
| 2018/0159856 A1 | 6/2018 | Gujarathi | |

* cited by examiner

HIGH AVAILABILITY VIRTUAL DESKTOP INFRASTRUCTURE

CROSS-REFERENCE TO RELATED APPLICATIONS

This application is a continuation application of U.S. patent application Ser. No. 16/807,159 filed Mar. 2, 2020 which itself claims the benefit of priority as a continuation of U.S. Ser. No. 15/648,549 filed Jul. 13, 2017 which has issued as U.S. Pat. No. 10,581,995, each of which are herein incorporated by reference.

TECHNICAL FIELD

This disclosure relates to a method and system for reliable operations of user desktops using Virtual Desktop Infrastructure (VDI) compatible with high availability requirements.

BACKGROUND

Modern user desktops often use virtualization of remote desktops that extend conventional desktops or even replace them for some users. This technology is referred to as a Virtual Desktop Infrastructure (VDI). Users connect to the VDI and can receive remote data and remote applications required for performing assignments and other work-related tasks.

VDI technology typically uses a remote datacenter as illustrated by FIG. 1. A client 101 is typically a thin client (e.g., a user's Smartphone, tablet, notebook or desktop). A user may connect to a datacenter via a VDI broker 102, which "knows" (based on a database 105) what resources to provide to the user as a desktop. User profiles (e.g., application configurations, data and documents) may be stored in data storage 104. The actual desktops (e.g., operating system ("OS") configurations and a set of applications) are often stored in a cluster 103 at the datacenter. A Virtual Execution Environment (VEE) serves as a personal desktop for a user of the client 101.

The broker 102 may select a required environment 106 and presents it to the client 101 as a desktop using a remote access channel (e.g., remote desktop protocol (RDP)). If none of the existing VEEs 106 are accessible by the user, the VDI broker may create a required VEE and provides it to the user. The user profile 107 is accessed in a user session by a standard solution. For example, a user login from MS Active directory can be used for delivering the profile. The profile can be stored in a distributed file system that serves as a shared storage (e.g., MICROSOFT™ DFS).

Users can be divided into groups and a VEE template may be created for further cloning across separate user groups. This technology is often referred to as a desktop pool. For example, a hypothetical company may have several accountants and several sale managers. A datacenter administrator can create an accountants' standard desktop, which includes typical accounting application 1C, MS Office™, etc. An accountant's VEE template may then be created, which can be cloned for each accountant and stored in the datacenter. Likewise, a template for sale managers may be creating using a different set of applications—e.g., CRM, MICROSOFT Office™, Skype, etc. Exclusive utilities can be added to the desktop of an individual user as well, without affecting the initial VEE template.

Conventional VDI systems that follow this model (as depicted by FIG. 1), such as VMware™ Horizon View, provide several advantages compared to non-virtualized infrastructure. These advantages include: (1) centralization—installation or updates of applications as well as security updates can be performed on one server instead of each user device; (2) mobility—users can be located far from the datacenter; (3) security—if a client device crashes, the user does not lose his data and his desktop can be easily displayed on another device which has VDI client, and if the device is lost or stolen, it does not result in loss of service data, because the thief does not know a password to connect to the datacenter.

While these solutions provide for stability and reliability of the system at the level of files and hardware nodes, they do not protect against failure of a datacenter due to a blackout or other similar disasters. Therefore, conventional systems are unsuitable for customers that require a VDI implementation that ensures that a prearranged level of operational performance is met during a contractual measurement period (i.e., a "high availability" VDI). As a result, there is a need in the art for systems that provide VDI desktops and other remote assets which are compliant with high availability requirements.

Accordingly, there is a need in the art for methods and systems for reliable operation of VDI user desktops compliant with high availability requirements by employing more than one datacenter.

SUMMARY

Accordingly, the present disclosure is related to methods and systems for reliable operations of user desktops using VDI compliant with high availability requirements that substantially obviate one or more of the disadvantages of the related art.

In some exemplary aspects, a VDI according to the disclosure may include two or more datacenters. In some exemplary aspects, data may be replicated on all datacenters and data from one datacenter may be known to another datacenter and vice-versa, providing redundancy. In some aspects, that data may comprise one or more of: user desktops (e.g., user profiles, user VEEs) and desktop pools (e.g., unique identifiers, types, links to user groups, links to template VEEs, template VEEs). In some exemplary aspects, the VDI may comprise a network of linked datacenters which provide total redundancy as to all VDI assets. In other aspects, the VDI may be only partially redundant. In still further aspects, a use of the VDI may be allowed to configure the degree of redundancy for some or all VDI assets (e.g., a user may be able to specify that critical VDI assets are duplicated at a minimum of three datacenters).

Desktop pools are typically formed based on user groups (e.g., formed by user position and company policy). Thus, the desktop pool may be formatted as a basic VEE image and policies for using the VEE. These policies may include copying the VEE, launching, allocating the VEE to a user, available VEE resource, etc. In practice, the VEE image is cloned and a new VEE is created for group members. The desktop pool is typically created by a datacenter administrator. In some exemplary aspects, one datacenter is allocated as a primary datacenter in local client configurations or on the DNS server. The primary datacenter may be selected based upon any useful parameter (e.g., geographic proximity, latency, user preferences).

A user may be given several attempts to access his desktop via the VDI. As noted above, the entry point for the VDI is typically a VDI broker responsible for presenting desktops to a user. If a primary datacenter is down and a user is not able to connect to his broker, the user may be redirected to a backup broker capable of directing a user to a backup datacenter. In some exemplary aspects, the address of a backup broker may also written in local client configurations or on the DNS server, providing additional redundancy in situations where the backup broker is also down.

In one exemplary aspect, a system for providing high availability VDI, comprises: at least two datacenters configured to provide virtual desktops to users; at least one VDI broker assigned to each datacenter; a VDI management node residing in each datacenter and configured to control its corresponding assigned VDI broker(s); at least one VDI hardware node residing in each datacenter configured to run at least one Virtual Execution Environment (VEE) representing a virtual desktop; a domain controller implemented at each datacenter; and a VDI database located within each datacenter accessible by the VDI broker(s) assigned to the corresponding datacenter, the VDI database configured to store global desktop pool configuration data, user group template data, and user desktops; wherein the VDI databases and VDI domain controllers of the at least two datacenters are synchronized, and when the user cannot connect to a first datacenter selected from the at least two datacenters, the user is redirected to a second datacenter selected from the at least two datacenters via the second datacenter's VDI broker. In some exemplary aspects, the second datacenter is a backup datacenter.

In some exemplary aspects, the second datacenter's VDI broker creates a new user desktop based upon the user group template and user desktop configuration data.

In some exemplary aspects, the second datacenter's VDI broker loads a user desktop from a shared storage.

In some exemplary aspects, the second datacenter's VDI broker provides a desktop IP address to the user in order for the user to access the user's virtual desktop.

In some exemplary aspects, the second datacenter's broker sends a desktop identifier to the user for accessing the user's virtual desktop.

In some exemplary aspects, the at least two datacenters comprise a plurality of backup datacenters configured to provide desktops to the user in a high availability mode.

In some exemplary aspects, all of the datacenters have mirrored data reflecting users, user groups, user profiles, and user desktops.

In some exemplary aspects, the VDI broker is configured to present at least one virtual desktop to users; and/or the domain controller is configured to access user profiles located on a distributed file system (DFS) file server.

In some exemplary aspects, the system further comprises a VDI broker farm implemented on each datacenter configured to provide virtual desktops to users.

In some exemplary aspects, the VEEs are Virtual Machines (VMs).

In some exemplary aspects, the VEEs are containers.

In some exemplary aspects, the VEEs reside on a cluster of hardware nodes.

In another exemplary aspect, the disclosure provides a computer-implemented method for providing high availability VDI to a user, comprising: resolving, by a VDI client, connection information of a VDI broker assigned to a datacenter; connecting the VDI client to the VDI broker assigned to the datacenter; sending authentication information to the VDI broker; authenticating the user through a domain controller using the authentication information; identifying one or more groups containing the user; retrieving a list of desktop pools available for the identified groups from a VDI database server; returning the list of desktop pools to the VDI client; sending a desktop pool identifier to the VDI broker; preparing a desktop for the user, selected from the desktop pool associated with the desktop pool identifier sent to the VDI broker; returning connection information to the VDI client; and optionally, closing a connection to the VDI broker.

In some exemplary aspects, the desktop executes inside a VEE.

In some exemplary aspects, the desktop is a dynamic desktop.

In some exemplary aspects, the desktop is a persistent desktop.

In some exemplary aspects, the method further comprises returning an internal address of the VEE within a cluster to the VDI client.

In some exemplary aspects, the method further comprises connecting to a second datacenter via a second VDI broker if a connection to a primary broker of a primary datacenter is not available.

In another exemplary aspect, a non-transitory computer readable medium for providing high availability VDI to a user, comprising computer-executable instructions for: resolving, by a VDI client, connection information of a VDI broker assigned to a datacenter; connecting the VDI client to the VDI broker assigned to the datacenter; sending authentication information to the VDI broker; authenticating the user through a domain controller using the authentication information; identifying one or more groups containing the user; retrieving a list of desktop pools available for the identified groups from a VDI database server; returning the list of desktop pools to the VDI client; sending a desktop pool identifier to the VDI broker; preparing a desktop for the user, selected from the desktop pool associated with the desktop pool identifier sent to the VDI broker; returning connection information to the VDI client; and optionally, closing a connection to the VDI broker.

In some exemplary aspects, the non-transitory computer readable medium for providing high availability VDI to a user, comprises computer-executable instructions for performing any of the methods disclosed herein.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Figure 1:
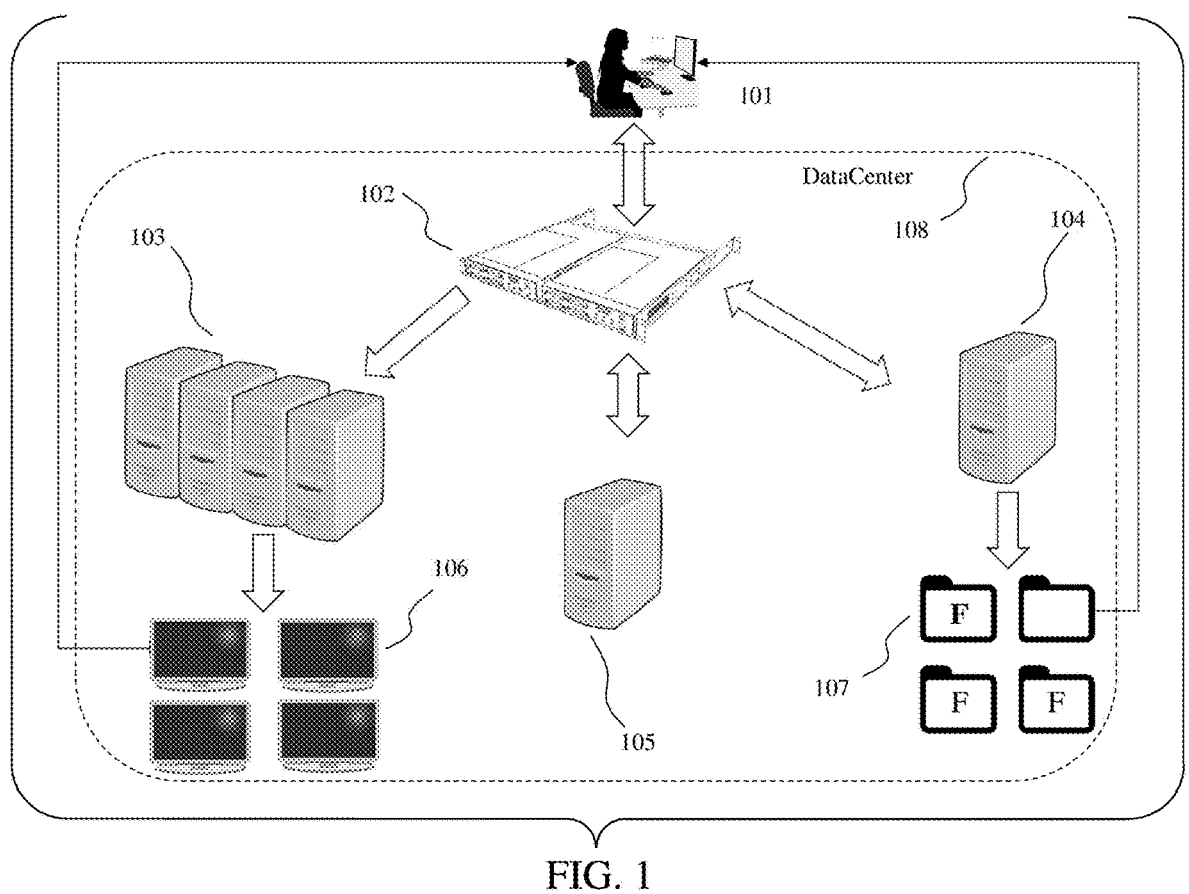
FIG. 1 is a block diagram that illustrates a conventional datacenter with one user.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

The following definitions are generally used throughout this description. It is understood that these definitions shall be used herein unless context clearly dictates otherwise.

High availability—a system design approach and associated service implementation that ensures that a prearranged level of operational performance is met during a contractual measurement period. For example, a client (e.g., a corporation or small business) may purchase access to a VDI infrastructure that guarantees >95% uptime or particular threshold of datacenter redundancy.

Thin client—a computer system of a client application in a client-server infrastructure which transfers most of data processing tasks to the server.

RDP—remote desktop protocol, a proprietary protocol developed by MICROSOFT™, which provides a user with a graphical interface to connect to another computer over a network connection.

DFS—distributed file system, a set of client and server services that allow an organization to organize many distributed file shares using a distributed file system. A DFS provides location transparency and redundancy to improve data availability in the face of failure or heavy load by allowing shares in multiple different locations to be logically grouped under one folder, or a DFS root.

Cluster—a group of computer systems typically connected by a high-speed channel and viewed by a user as a single hardware resource.

Security gateway—a firewall that can either be software-based or hardware-based and is used to keep a network secure. Its primary objective is typically to control the incoming and outgoing network traffic by analyzing the data packets and determining whether it should be allowed through or not, based on a predetermined set of rules.

VEE—Virtual Execution Environment, a type of environment that supports program code execution, where at least a part of the real hardware and software required for running program code are presented as their virtual analogs. From the point of view of the user, the code in VEE runs as if it were running on the real computing system. An example of VEE is a Virtual Machine (VM).

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

VE—Virtual Environment, for example, a Virtual Private Server (VPS), is one type of a Virtual Execution Environment (VEE) running on the same hardware system with a shared OS kernel and most of the system resources, where isolation of Virtual Execution Environments is implemented on the namespace level.

A Virtual Private Server (VPS), sometimes referred to as "container" is a closed set, or collection, of processes, system resources, users, groups of users, objects and data structures. Each VPS has its own ID, or some other identifier, that distinguishes it from other VPSs.

A VPS may offer to its users a service that is substantially equivalent to a standalone server with a remote access, with respect to functionality. From the perspective of an administrator of the VPS, the VPS should preferably act the same as a dedicated computer at a datacenter. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. However, in some implementations these parameters may vary compared to a dedicated computer at the datacenter.

An exemplary aspect of the present disclosure is directed to a method and system for reliable operations of user desktops using VDI by using several datacenters. In some exemplary aspects, data may be replicated on all datacenters and data from one datacenter may be known to another datacenter and vice-versa, providing redundancy. In some aspects, that data may comprise one or more of: user desktops (e.g., user profiles, user VEEs) and desktop pools (e.g., unique identifiers, types, links to user groups, links to template VEEs, template VEEs). The VEEs can be VMs or containers.

In some exemplary aspects, the VDI may comprise a network of linked datacenters which provide total redundancy as to all VDI assets. In other aspects, the VDI may be only partially redundant. In still further aspects, a use of the VDI may be allowed to configure the degree of redundancy for some or all VDI assets (e.g., a user may be able to specify that critical VDI assets are duplicated at a minimum of three datacenters).

Desktop pools may be formed based on user groups (e.g., formed by user position and company policy). Thus, the desktop pool may be formatted as a basic VEE image and policies for using the VEE. The policies may include copying the VEE, launching, deleting, allocating the VEE to a user, available VEE resource, etc. In practice, the VEE image may be cloned so that a new VEE is created for one or more group members. The desktop pool may be created by a datacenter administrator. In some exemplary aspects, one datacenter is allocated as a primary datacenter in local client configurations or on a DNS server.

In some exemplary aspects, a user is given several attempts to access his desktop via VDI. The entry point is typically a VDI broker responsible for presenting desktops to a user. If a primary datacenter is down and a user is not able to connect to his broker, the user may be redirected to a backup broker of the backup datacenter. In some exemplary aspects, the address of the backup broker may also written in local client configurations or on the DNS server. The backup broker may be configured to authenticate a user and to query VDI database to determine one or more user desktop configuration(s) stored in the database in a current state because of the real-time replications. The backup broker may create a new desktop for the user. In some exemplary aspects, a new desktop is created which is identical to the lost desktop using the same configuration(s). The desktop may be stored on different storages belonging to different datacenters. The user profiles may be stored in a shared storage (e.g., DFS). In this scenario, a fast and reliable distributed storage is not needed. In some exemplary aspects, all modifications the user made during a session (e.g., installation of a new application) are discarded upon closing of the session, and only the user profile configurations remain current.

In some exemplary aspects, the system can have two authentication centers in both VDIs and as long as one VDI stays alive, the secure connection can be established and re-established using known techniques. This same technique can be used for accessing a database. As an alternative, a user may be allowed to connect to the VDI if he is already connected to the database. When the user is not connected to the database it is of no use to connect to the VDI (unless it is done for administrative purposes only). The database server can have a secure procedure designated for both the VDI and the database. The secure procedure can be physically placed on the database server and in some exemplary aspects will have the same IP address. This implementation can increase security.

In another scenario, the VEEs are stored in a shared distributed storage and a user's desktop is not lost and can be delivered to a user by means of a backup datacenter. The desktop may be stored in a storage shared by two (or more) datacenters. In some exemplary aspects, some of the desktop personal settings (e.g., an application installed by a user) are not saved into the profile. However, these configurations may be saved from session to session. This architecture typically requires fast and reliable distributed storage.

Accordingly, a broker may provide a desktop to a user by a first possible scenario. In this exemplary aspect, the user profiles of both datacenters are synchronized, and so a new user may receive his profile from DFS when the session is opened with a restored VEE. Therefore, replication of user group data and user data between the datacenters and redirection of the user to the backup datacenter solves a problem of high availability a datacenter level.

Figure 2:
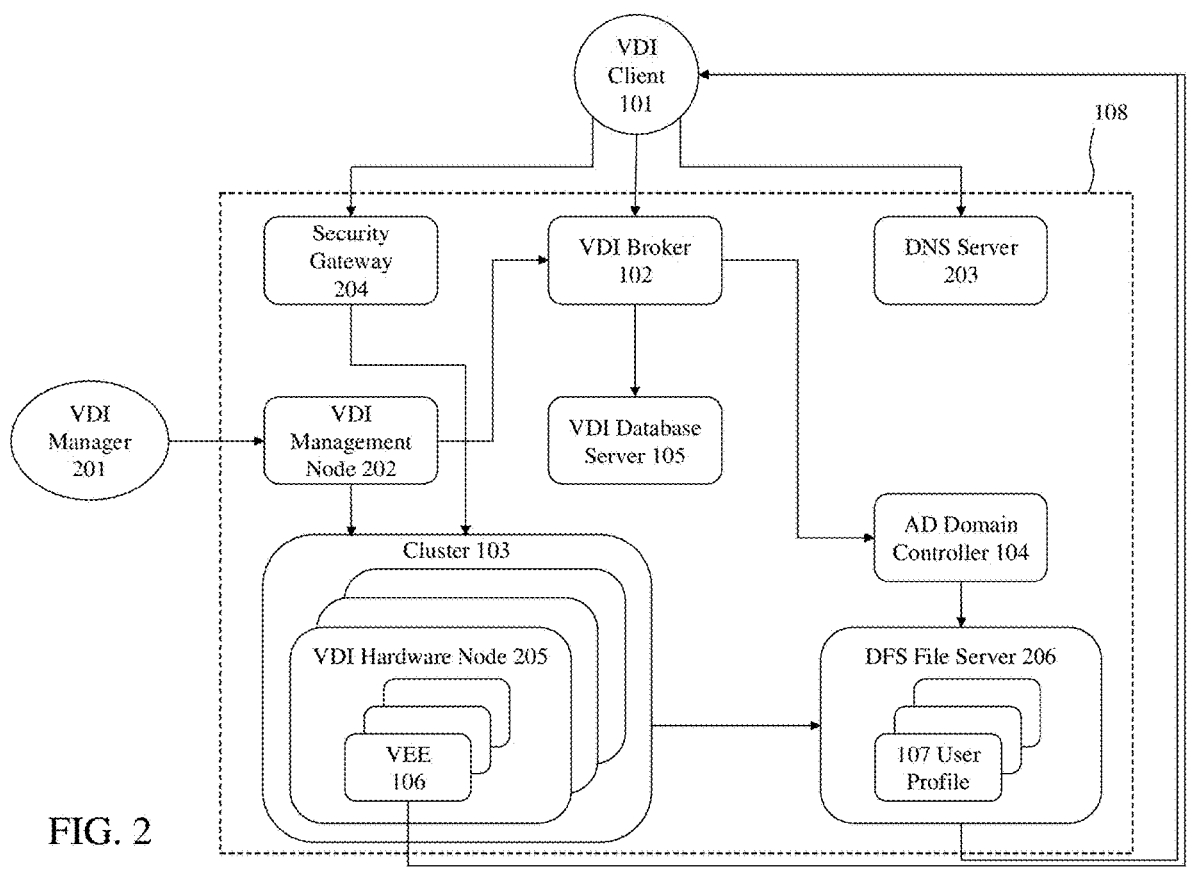
FIG. 2 is a block diagram that illustrates an architecture of a datacenter with more than one user.

FIG. 2 illustrates architecture of a datacenter with more than one user. An exemplary datacenter 108 can be implemented using MICROSOFT™ solutions. A directory service Active Directory (AD) may provide a central location for network administration and security. Server computers that run Active Directory (AD) are called domain controllers 104. The AD domain controller 104 authenticates and authorizes all users and computers in a MICROSOFT™ Windows domain type network.

A DFS file server 206 may be configured to store user profiles 107. In MICROSOFT™ Windows such a directory may be found at "C:\Document and settings\<user_name>". A user may store different files (text files, images, media files, etc.) into this directory. This directory also stores user configurations that the user acquired by working with different applications provided in his desktop 106. Users may be divided into groups based on user rights (e.g., access control privileges or other criteria). Data reflecting user association with a group and group rights are stored in the AD domain controller 104.

User desktops 106 and group desktop templates are stored on computers 205, aggregated into a cluster 103. A datacenter administrator (VDI manager 201), may create a desktop template for each user group via a VDI management node 202 and place it into the cluster 103. Two types of desktops may be used: (1) persistent desktop—created once, linked to a user, who only works with this desktop and can modify it (changes are saved from session to session); or (2) dynamic desktop—the same desktop is presented to the user at a new session, and if the user modifies the desktop during the session, all of the modifications are discarded (by user request or automatically) upon closing the session. The dynamic desktop is used for strict security so the user does not harm his desktop. The persistent desktop allows the user to work with applications that were installed once at each subsequent session. A VDI database server 105 is a database, which stores desktop pools and user desktops' configurations.

A DNS server 203 is a component of the datacenter infrastructure used for resolving a hostname (i.e., for translation of symbol-based domain names into IP addresses). The user 101 may communicate with the datacenter 108 via a security gateway 204 in order to maintain network security. The security gateway 204 can drop the connection between a user and a desktop by a command from the broker.

A VDI broker 102 is a system component responsible for presenting and controlling of the desktops 106. The VDI broker 102 provides a user from the AD his corresponding desktop. All objects in FIG. 2 can be divided into:

(1) Common Infrastructure Components:
  a.—AD Domain Controller;
  b.—DFS File Server;
  c.—DNS Server; and
(2) Virtual Desktop Infrastructure Components:
  a.—VDI Broker;
  b.—VDI Database Server;
  c.—VDI Management Node;
  d.—VDI Hardware Nodes;
  e.—Security gateway.

In some exemplary aspects, a user session is implemented as follows. A user of the device 101 may connect to a datacenter 108 in order to receive his desktop 106. First, the user connects to a DNS server to acquire IP address of the VDI broker 102. Alternatively, the IP address can be stored in a local client application. After connecting and authenticating the user, the VDI broker queries the database 105 for user profile data. The VDI DB server 105 finds a corresponding user with his desktop 106 and provides user data to the VDI broker 102, which now know the addresses the user can access to get the desktop 106.

In some exemplary aspects, the VDI broker 102 may be configured to provide to the user the address of the gateway 204 and an internal address of the user VEE 106 within the cluster 103. The user may then proceed to open a VEE session at the received address. The user profile 107 is retrieved from the DFS file server 206 for this session. When the user logs in using a domain name and a password, the user profile is loaded by Active Directory. Note that the thin client 101 must have a local remote desktop access application installed on it.

Figure 3:
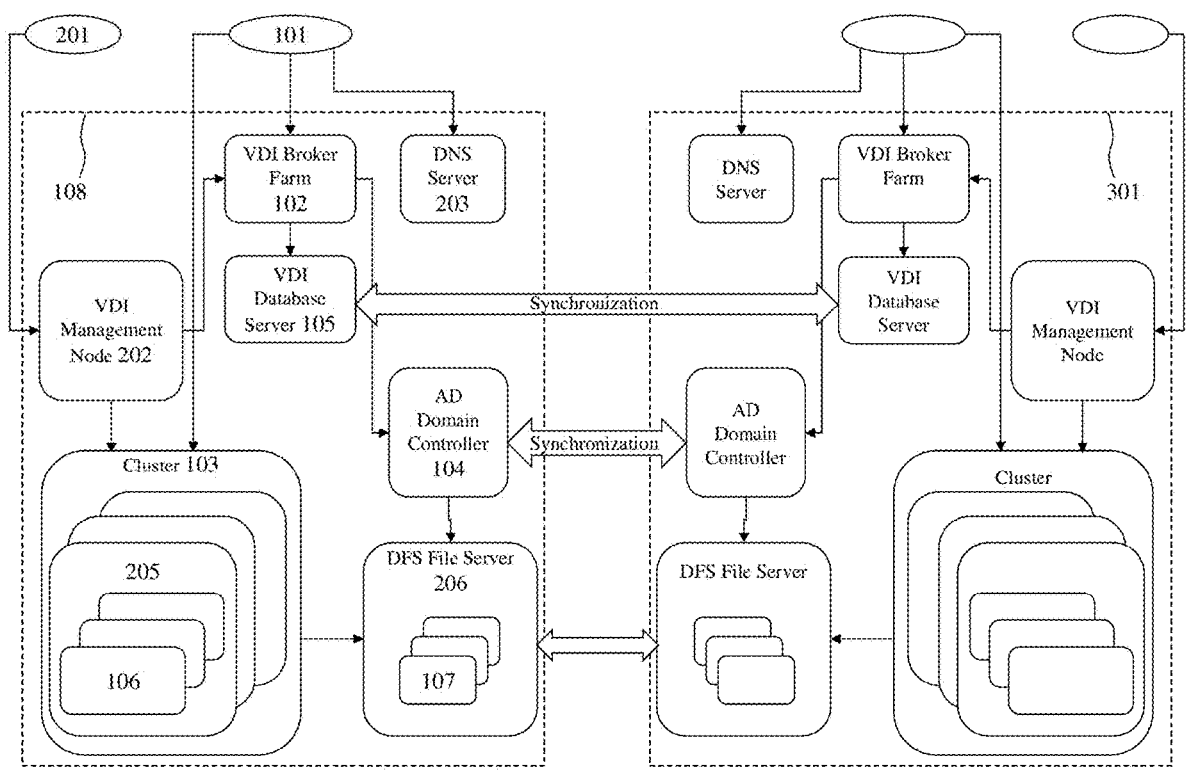
FIG. 3 is a block diagram that illustrates a system with two datacenters, in accordance with the exemplary embodiment.

In order to improve system stability and reliability, a second datacenter may be used as shown in FIG. 3. According to the exemplary embodiment, the system is scalable and can include more than two datacenters. For the purpose of illustration only two datacenters are depicted in FIG. 3. In this exemplary aspect, each datacenter has its own set of users 101. An address of a primary VDI broker 102 is written in local configurations (or on the DNS server) of each user. Also an address of a backup broker is written in user configurations. Thus, if the first VDI broker resides in a first datacenter 108, the backup broker is located in the second datacenter 301 and vice versa. The two datacenters operate independent from each other.

In some exemplary aspects, key user states are constantly synchronized. The databases residing on the two VDI database servers 105 may be replicated in on-line mode. Thus, the datacenters find out about configurations of user desktops 106 and about user group templates as soon as they have been changed, because replication is performed after any commit operation in any of the databases. Corporate user data and information about user groups are synchronized between AD domain controllers 104. User data 107 stored on the DFS file server 206 is also synchronized after the user closes the session. Additionally, in some exemplary aspects an agent (a resident application service) may be configured to monitor user activity during a session and close the session if the user does not do anything for a certain time period (e.g., after an hour of inactivity). This improves synchronization, because the user profiles typically cannot be synchronized while the session is open. This also improves security—i.e., standby equipment automatically takes over when the main system fails, thereby protecting computer systems from failure.

The two datacenters may be configured to have an identical structure. In FIG. 3 the datacenter objects are separated in space. This can be either physical separation or logical separation. In case of physical separation, the datacenter objects are located on the same computer system. In case of logical separation, VDI database servers 203 reside on the same computer system and access a common database, which contains the same data for all datacenters (e.g., global desktop pool properties). The datacenters may also access respective local databases, which contains each datacenter's specific information such as virtualization hosts details.

In some exemplary aspects, two DFS file servers 206 may be used to replicate common file storage. Similarly, two AD Domain Controllers 104 work in the same domain. The VDI broker farm 102 is an aggregation of broker applications. Each of these broker applications operates on its own server (physical or virtual). However, all broker applications use a common configuration database. This solution is appropriate for large enterprises with a large number of users and VDI pools, where the system load needs to be divided.

Figure 4:
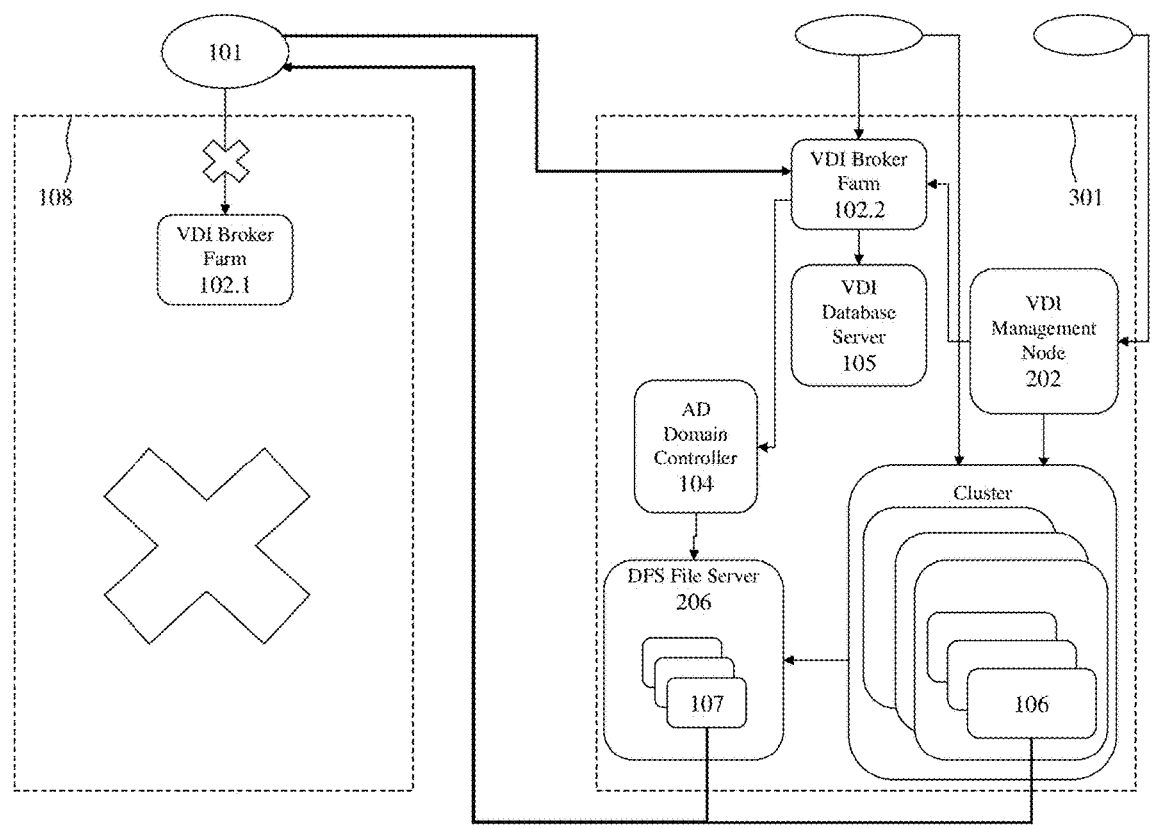
FIG. 4 is a block diagram that illustrates a scenario with two datacenters, one of which is down.

In the case of a failure of a first datacenter 108, a scenario depicted in FIG. 4 may be implemented. Each of the thin clients "knows" the address of the broker of the second datacenter 108. As such, the thin clients may be configured such that after a set number of failed attempts to connect to the broker 102.1 of the first datacenter 108, the user 101 is redirected to the broker 102.2 of the second datacenter 301. The broker 102.2 "knows" about configurations and user group of the "new" user.

Note that if user files 107 are physically located on DFS file server 206 of the second datacenter 301, the VEE with a user work environment may not be created, but the configuration data is present in the VDI database server 105. The broker 102.2 creates a new VEE 106 using management node 202 based on a group template. Then, the VEE is provided to the new user. In this exemplary aspect, the user VEE session is the user virtual desktop.

According to some exemplary aspects, the desktops are stored on a shared storage common to both datacenters used by nodes 205 of the cluster 103. Then, if the node fails, the desktop can be restored, because it is stored outside of the node. After the user is redirected from the failed broker 102.1 to the broker 102.2, the user connects to the second datacenter 301 and has a normal session. If the user 101 closes the session and, then, wants to receive his desktop again, the user 101 attempts to connect to his primary broker 102.1 of the first datacenter 108.

Thus, if the first datacenter 108 is up and running again, the assigned users may remain with their primary first datacenter 108. Alternatively, the system can change a status of the brokers 102.1 and 102.2 after unsuccessful attempt to connect to the broker 102.1 and subsequent connection to the broker 102.2. The broker 102.2 may be thus be changed to a primary broker and the broker 102.1 may become a backup broker.

Figure 5:
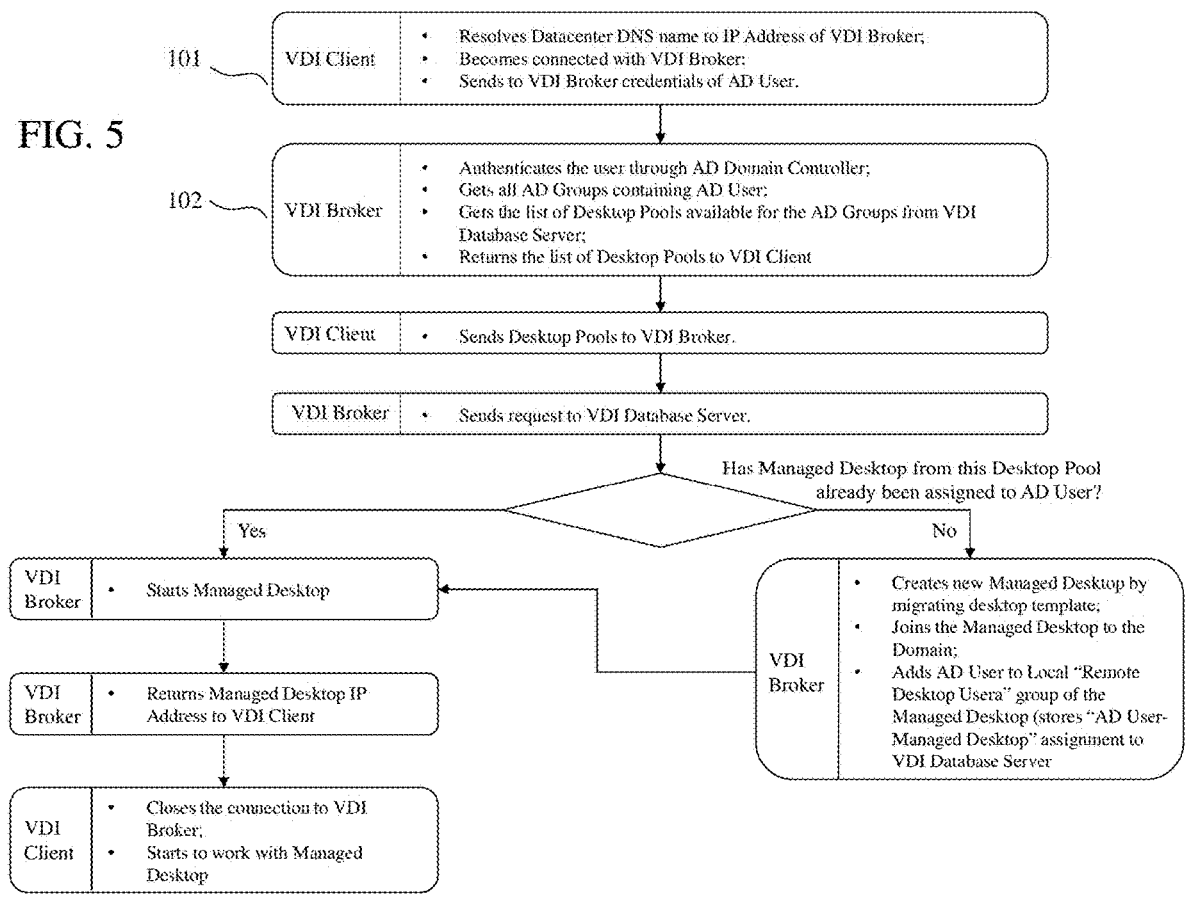
FIG. 5 is a flowchart illustrating a method for providing high availability VDI, in accordance with an exemplary aspect of the disclosure.

FIG. 5 illustrates a workflow of the VDI infrastructure in accordance with an exemplary aspect. In this example, the broker address is written in DNS server. In step 510 a VDI client resolves datacenter DNS name to IP address of a VDI Broker and becomes connected with VDI broker. The VDI client sends credentials of an AD user to VDI broker.

In step 515, the VDI broker authenticates the user through an AD Domain Controller; acquires all AD groups containing AD user; gets the list of desktop pools available for the AD Groups from VDI Database Server; and returns the list of desktop pools to the VDI client. In step 520, the VDI client sends desktop pool identifier to the VDI broker. In step 525, the VDI broker sends request to VDI Database Server.

If a managed desktop from this desktop pool has already been assigned to AD user in step 530, the VDI broker starts the desktop in step 540. In step 545, the VDI broker returns a managed desktop IP address to the VDI client. In step 550, the VDI client closes the connection to the VDI broker and starts to work with Managed Desktop.

If a managed desktop from this desktop pool has not already been assigned to the AD user in step 530, the VDI broker may create a new managed desktop by migrating the desktop template, linking the managed desktop to the domain, and adding AD user to local "Remote Desktop Users" group of the managed desktop (storing the "AD user managed desktop" assignment to a VDI Database Server in step 560).

Figure 6:
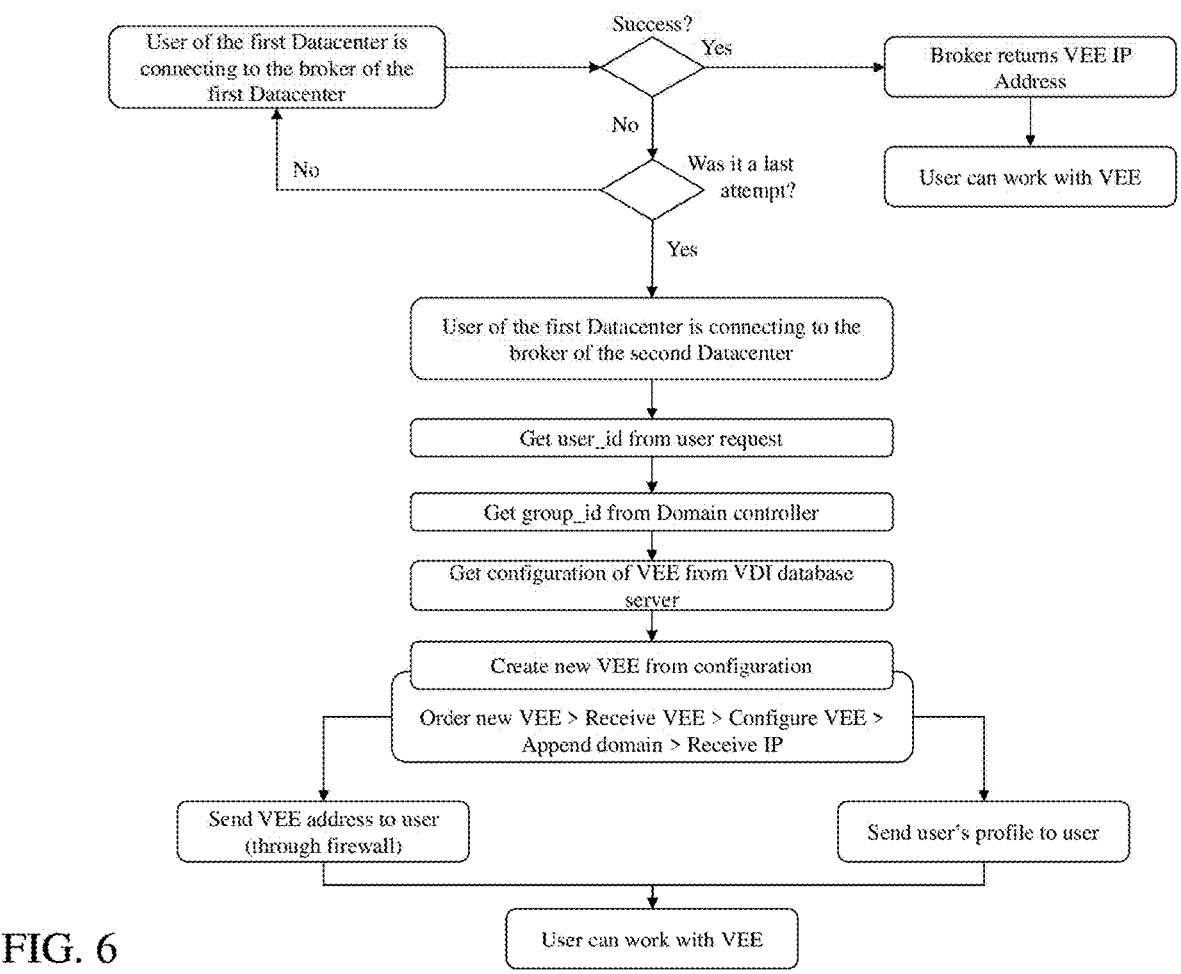
FIG. 6 is a flowchart illustrating a method for creating a new user desktop in a backup datacenter, in accordance with an exemplary aspect of the disclosure.

FIG. 6 illustrates a flow chart for creating a new user desktop in the backup datacenter, in accordance with the exemplary embodiment. In this example, the broker address is written in the configurations of the local user device. The VDI panel is implemented as a separate component configured to control desktop pools and display all VEE activities (e.g., which users are active with what rights). Exemplary VEE activities include, remote desktop group user rights and/or local administrator rights.

In step 510, a user of the first datacenter connects to a broker of the first datacenter. If a connection is successful at step 515, the broker returns a VEE IP address in step 520. Note that in some exemplary aspects, a unique identifier can be used instead of an IP address. For example, a user may be provided with a globally unique identifier (GUID), which may be transmitted to or otherwise detected by the broker and used to determine a VEE IP address so that traffic from the user's client may be redirected accordingly. Then, the user begins working with the VEE in step 525. If connection is unsuccessful in step 515, the process may check if it is a last attempt to connect in step 530. If more attempts are left, another connection attempt is made in step 510. If no more connection attempts are left in step 530, the user of the first datacenter connects to the broker of the second datacenter in step 535. The broker acquires the user id from the user request in step 540.

In step 545 the broker acquires a group ID from domain controller. The broker obtains a configuration of a VEE from a VDI database server in step 550. The broker may create a new VEE from the configuration in step 555. In step 565, the broker may send a VEE address to the user through a firewall. In step 560, the broker may send the user's profile to the user. This optional step may be advantageous in cases where a user connects to multiple virtual desktops (e.g., providing the profile allows a user to maintain files and preferences across multiple virtual desktops). In step 570, the user may begin to work with the VEE.

In some exemplary aspects according to the disclosure, datacenter components may communicate as follows:
1. VDI Client->DNS Server
   a.—Resolving datacenter DNS name to IP Address of VDI Broker
2. VDI Client->VDI Broker
   a.—Getting a list of available Desktop Pools for AD User
   b.—Getting Managed Desktop from Desktop Pool
3. VDI Client->PVC ("Parallels Virtuozzo Containers," or Virtuozzo Containers) Group
   a.—Connecting via remote protocol to Managed Desktop with loaded Roaming User Profile
   b.—Connecting to Desktop via remote protocol through Security gateway
4. VDI Broker->AD Domain Controller
   a.—Authenticating AD User
   b.—Getting list of AD User Groups for AD User
5. VDI Broker->VDI Database Server
   a.—Storing/retrieving configuration data
6. VDI Broker->Hardware Node Cluster
   a.—Creating Managed Desktops by VDI Client request
   b.—Starting Managed Desktops by VDI Client request
   c.—Deleting stopped Dynamic Managed Desktops
7. VDI Hardware Node->VDI Broker
   a.—Notifying about changes in Managed Desktop power states
8. VDI Management Node->VDI Broker
   a.—Providing configuration data
9. Management via web-browser->VDI Management Node
   a.—Managing configuration data via GUI
10. VDI Management Node->Hardware Node Cluster
    a.—Preparing Desktop Templates on Virtualization Hosts
11. Hardware Node Cluster->DFS File Server
    a.—Loading Roaming User Profile Those skilled in the art will appreciate that the proposed method provides for a more reliable VDI compatible with high availability requirements.

According to one exemplary embodiment, the VDI can be used by a user for printing documents as if they are local. In order to implement remote printing from the virtual desktop, data is sent to the server, typically in a compressed format. In some exemplary aspects, one or more virtual printers may be created in the virtual desktop as proxies for corresponding local printer(s) available to the user. For example, the virtual desktop may be configured to detect when a user tries to print using the virtual desktop, convert the print job to an electronic format (e.g., PDF), transfer the converted print job to the user's local computer, and to print the converted print job using the local client printer that corresponds to the virtual printer selected by the user. This configuration allows a user to seamlessly print physical documents using a virtual printer provided in the virtual desktop.

Figure 7:
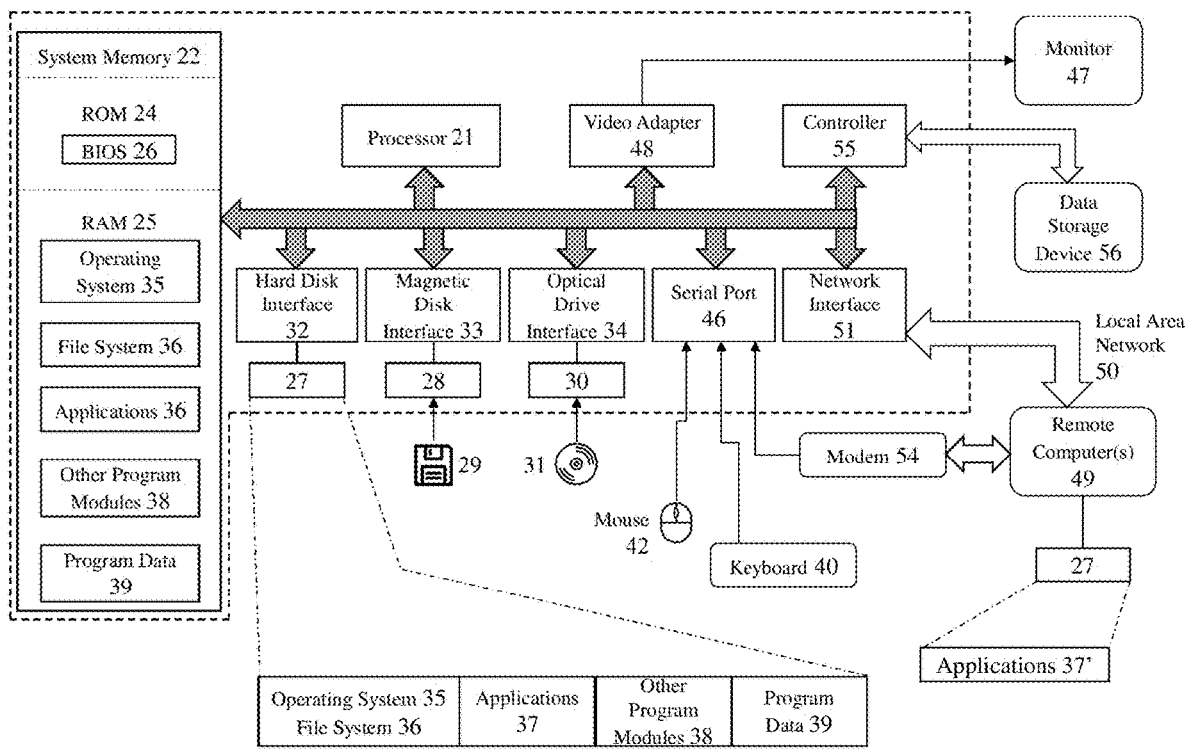
FIG. 7 is a block diagram of an exemplary general-purpose computer system on which the disclosed systems and methods can be implemented.

FIG. 7 illustrates a block diagram of an example of a general-purpose computer system on which the disclosed systems and methods can be implemented according to various exemplary aspects. More particularly, a general purpose computing device is provided in the form of a computer system 20 that illustrates exemplary components that can be provided for a computing device, such as mobile device or server. As shown, the computer system 20 can include a processing unit 21, a system memory 22, and a system bus 23 that couples various system components including the system memory to the processing unit 21. It should be appreciated that processing unit 21 can correspond to CPU 210, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like, provided for receiving speech based commands, for example.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, such as computing device 120, a server, a router, a network PC, a peer device or other common network node, and typically includes many or all of the elements described above relative to the computer 20. The logical connections include a network interface 51 and a wide area network (WAN). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. One or more of the above-noted components can correspond to I/O interface 220 according to an exemplary aspect.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for providing high availability Virtual Desktop Infrastructure (VDI) to a user, comprising:
   providing a primary data center configured to provide virtual desktops to users;
   providing a secondary data center configured to provide virtual desktops to users;
   establishing whether an event relating to a virtual desktop of a user has occurred with respect to the primary data center; and
   upon a positive determination establishing another virtual desktop for the user upon the secondary data center; wherein
   each of the primary data center and secondary data center further comprises a VDI database accessible by the VDI broker assigned to the corresponding datacenter; wherein
   the VDI database is configured to store global desktop pool configuration data, user group template data, and user desktops;
   the VDI databases of the primary data center and secondary data center are synchronized;
   the domain controllers of the primary data center and secondary data center are synchronized; and
   replication between the VDI databases is performed after any commit operation in any of the VDI databases.

2. A computer-implemented method for providing high availability Virtual Desktop Infrastructure (VDI) to a user, comprising:
   providing a primary data center configured to provide virtual desktops to users;
   providing a secondary data center configured to provide virtual desktops to users;
   establishing whether an event relating to a virtual desktop of a user has occurred with respect to the primary data center; and
   upon a positive determination establishing another virtual desktop for the user upon the secondary data center; wherein
   either:
      each of the primary data center and secondary data center further comprises:
         a VDI management node configured to control a VDI broker assigned to it from a pool of VDI brokers;
         at least one VDI hardware node configured to run at least one Virtual Execution Environment (VEE) representing a virtual desktop;
         a domain name system (DNS) server; and
         a VDI database accessible by the VDI broker assigned to the corresponding datacenter;
      the VDI database is configured to store global desktop pool configuration data, user group template data, and user desktops;
      the DNS server of the primary data center stores an address of the VDI broker assigned to the secondary data center;
      the event is failure of a user to connect to a VDI broker assigned to the primary data center to establish the virtual desktop of the user;
      establishing the another virtual desktop for the user upon the secondary data center is initiated by the DNS server of the primary data center communicating the address of the VDI broker assigned to the secondary data center to an electronic device associated with the user;

the VDI databases of the primary data center and secondary data center are synchronized; and the domain controllers of the primary data center and secondary data center are synchronized;

or:

each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop;

a domain controller; and a VDI database accessible by the VDI broker assigned to the corresponding datacenter;

the VDI database is configured to store global desktop pool configuration data, user group template data, and user desktops;

the domain controller of the primary data center stores an address of the VDI broker assigned to the secondary data center;

the event is failure of a user to connect to a VDI broker assigned to the primary data center to establish the virtual desktop of the user;

establishing the another virtual desktop for the user upon the secondary data center is initiated by an application in execution upon an electronic device associated with the user which has a local configuration storing the address of the VDI broker assigned to the primary data center and another addressed of the VDI broker assigned to the secondary data center;

the VDI databases of the primary data center and secondary data center are synchronized; and the domain controllers of the primary data center and secondary data center are synchronized.

3. A computer-implemented method for providing high availability Virtual Desktop Infrastructure (VDI) to a user, comprising:

providing a primary data center configured to provide virtual desktops to users;

providing a secondary data center configured to provide virtual desktops to users;

establishing whether an event relating to a virtual desktop of a user has occurred with respect to the primary data center; and upon a positive determination establishing another virtual desktop for the user upon the secondary data center; wherein either:

each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop; and a domain name system (DNS) server;

a VDI database accessible to the pool of VDI brokers is configured to store global desktop pool configuration data, user group template data, and user desktops;

the DNS server of the primary data center stores an address of the VDI broker assigned to the secondary data center;

the event is failure of a user to connect to a VDI broker assigned to the primary data center to establish the virtual desktop of the user;

establishing the another virtual desktop for the user upon the secondary data center is initiated by the DNS server of the primary data center communicating the address of the VDI broker assigned to the secondary data center to an electronic device associated with the user; and the domain controllers of the primary data center and secondary data center are synchronized;

or:

each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop; and a domain controller;

a VDI database accessible to the pool of VDI brokers is configured to store global desktop pool configuration data, user group template data, and user desktops;

the domain controller of the primary data center stores an address of the VDI broker assigned to the secondary data center;

the event is failure of a user to connect to a VDI broker assigned to the primary data center to establish the virtual desktop of the user;

establishing the another virtual desktop for the user upon the secondary data center is initiated by an application in execution upon an electronic device associated with the user which has a local configuration storing the address of the VDI broker assigned to the primary data center and another addressed of the VDI broker assigned to the secondary data center;

the domain controllers of the primary data center and secondary data center are synchronized.

4. A computer-implemented method for providing high availability Virtual Desktop Infrastructure (VDI) to a user, comprising:

providing a primary data center configured to provide virtual desktops to users;

providing a secondary data center configured to provide virtual desktops to users;

establishing whether an event relating to a virtual desktop of a user has occurred with respect to the primary data center; and upon a positive determination establishing another virtual desktop for the user upon the secondary data center; wherein each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop;

a domain controller; and a VDI database accessible by the VDI broker assigned to the corresponding datacenter;

each VDI database is configured to store global desktop pool configuration data, user group template data, and user desktops;

the VDI databases of the primary data center and secondary data center are synchronized;

the domain controllers of the primary data center and secondary data center are synchronized;

the event is failure of a user to connect to a VDI broker assigned to the primary data center to establish the virtual desktop of the user; and establishing the another virtual desktop for the user upon the secondary data center is established by a process comprising the steps of:

establishing an address of the VDI broker assigned to the secondary data center upon electronic device associated with the user;

authenticating the user in dependence upon a request received by the VDI broker assigned to the secondary data center from the electronic device associated with the user;

querying the VDI database of the secondary data center to determine one or more user desktop configurations stored in the VDI database of the secondary data center in a current state;

upon a positive determination that there are one or more user desktop configurations stored in the VDI database of the secondary data center in the current state establishing the another virtual desktop upon the secondary data center in dependence upon the one or more user desktop configurations stored in the VDI database of the secondary data center in the current state; and upon a negative determination that there are one or more user desktop configurations stored in the VDI database of the secondary data center in the current state establishing the another virtual desktop upon the secondary data center as a new desktop.

5. A computer-implemented method for providing high availability Virtual Desktop Infrastructure (VDI) to a user, comprising:

providing a primary data center configured to provide virtual desktops to users;

providing a secondary data center configured to provide virtual desktops to users;

establishing whether an event relating to a virtual desktop of a user has occurred with respect to the primary data center; and upon a positive determination establishing another virtual desktop for the user upon the secondary data center; wherein each of the primary data center and secondary data center further comprises a VDI database accessible by the VDI broker assigned to the corresponding datacenter;

the VDI database is configured to store global desktop pool configuration data, user group template data, and user desktops;

the VDI databases of the primary data center and secondary data center are synchronized;

the domain controllers of the primary data center and secondary data center are synchronized;

replication between the VDI databases is performed after any commit operation in any of the VDI databases; and an agent associated with the primary data center upon which the virtual desktop of the user has been established:

monitors activity during a session associated with the virtual desktop of the user occurred with respect to the primary data center;

determines whether there has been no activity within the session or a predetermined time period; and upon a positive determination closes the session such that a user profile associated with the user can be synchronized.

6. A computer-implemented method for providing high availability Virtual Desktop Infrastructure (VDI) to a user, comprising:

providing a primary data center configured to provide virtual desktops to users;

providing a secondary data center configured to provide virtual desktops to users;

establishing whether an event relating to a virtual desktop of a user has occurred with respect to the primary data center; and upon a positive determination establishing another virtual desktop for the user upon the secondary data center; wherein either:

each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop;

a domain controller; and a VDI database accessible by the VDI broker assigned to the corresponding data center configured to store global desktop pool configuration data, user group template data, and user desktops;

the event is failure of a user to connect to a VDI broker assigned to the primary data center to establish the virtual desktop of the user;

the another virtual desktop for the user upon the secondary data center is established via the VDI broker assigned to the secondary data center receiving a request from an electronic device associated with the user;

the address of the VDI broker assigned to the secondary data center was established upon the electronic device by one of retrieving it from a local configuration stored upon the electronic device, receiving it in a first communication received from the domain controller of the primary data center, and receiving it in a second communication received from the VDI broker assigned to the primary data center the VDI databases of the primary data center and secondary data center are synchronized; and the domain controllers of the primary data center and secondary data center are synchronized;

or:

each of the primary data center and secondary data center further comprises:

a VDI management node configured to control a VDI broker assigned to it from a pool of VDI brokers;

at least one VDI hardware node configured to run at least one Virtual Execution Environment (VEE) representing a virtual desktop;

a distributed file system (DFS) server storing user profiles; and a VDI database accessible by the VDI broker assigned to the corresponding data center configured to store global desktop pool configuration data, user group template data, and user desktops;

the domain controller of the primary data center stores an address of the VDI broker assigned to the secondary data center;

the event is failure of a user to connect to a VDI broker assigned to the primary data center to establish the virtual desktop of the user;

the another virtual desktop for the user upon the secondary data center is established via the VDI broker assigned to the secondary data center receiving a request from an electronic device associated with the user;

the address of the VDI broker assigned to the secondary data center was established upon the electronic device by one of retrieving it from a local configuration stored upon the electronic device, receiving it in a first communication received from the domain controller of the primary data center, and receiving it in a second communication received from the VDI broker assigned to the primary data center the VDI databases of the primary data center and secondary data center are synchronized; and the DFS servers of the primary data center and secondary data center are synchronized.

* * * * *